(12) United States Patent
Boddy et al.

(10) Patent No.: US 7,370,985 B2
(45) Date of Patent: May 13, 2008

(54) VEHICULAR MIRROR WITH SLIP CLUTCH FOR JACK SCREW ACTUATOR

(76) Inventors: Ian Boddy, 3447 Lakecrest Ct., Ada, MI (US) 49301; Keith D. Foote, 1219 Ridgebrook Ct., Kentwood, MI (US) 49508

( * ) Notice: Subject to any disclaimer, the term of this patent is extended or adjusted under 35 U.S.C. 154(b) by 0 days.

(21) Appl. No.: 10/707,567

(22) Filed: Dec. 22, 2003

(65) Prior Publication Data
US 2004/0125476 A1 Jul. 1, 2004

Related U.S. Application Data

(60) Provisional application No. 60/319,823, filed on Dec. 30, 2002.

(51) Int. Cl.
- G02B 5/08 (2006.01)
- G02B 7/182 (2006.01)
- B60R 1/06 (2006.01)

(52) U.S. Cl. .................. 359/872; 359/874; 359/876; 359/877; 248/478; 248/481

(58) Field of Classification Search .............. 359/872, 359/873, 874, 876, 877; 248/481, 483, 478, 248/480, 485
See application file for complete search history.

(56) References Cited

U.S. PATENT DOCUMENTS

| | | | | |
|---|---|---|---|---|
| 2,112,656 A * | 3/1938 | Ponce | ............ | 403/144 |
| 3,339,877 A * | 9/1967 | Valenzuela | ............ | 248/481 |
| 3,530,495 A * | 9/1970 | Kindel | ............ | 403/140 |
| 3,978,735 A * | 9/1976 | Repay et al. | ............ | 74/424.95 |
| 4,158,483 A * | 6/1979 | Fisher et al. | ............ | 359/876 |
| 4,234,246 A * | 11/1980 | Wunsch et al. | ............ | 359/877 |
| 4,498,738 A * | 2/1985 | Kumai | ............ | 359/874 |
| 4,504,116 A * | 3/1985 | Sharp | ............ | 359/873 |
| 4,504,165 A * | 3/1985 | Moeremans | ............ | 403/129 |
| 4,572,626 A * | 2/1986 | Suzuki | ............ | 359/874 |
| 4,678,295 A * | 7/1987 | Fisher | ............ | 359/874 |
| 4,818,090 A * | 4/1989 | Righi | ............ | 359/874 |
| 4,824,232 A * | 4/1989 | Thompson | ............ | 359/873 |
| 5,274,505 A * | 12/1993 | Nagayama et al. | ............ | 359/874 |
| 5,343,333 A * | 8/1994 | Nagayama et al. | ............ | 359/874 |
| 5,377,949 A * | 1/1995 | Haan et al. | ............ | 248/549 |
| 5,568,326 A * | 10/1996 | Yoshida et al. | ............ | 359/872 |
| 5,701,211 A * | 12/1997 | Perry et al. | ............ | 359/873 |
| 5,984,482 A * | 11/1999 | Rumsey et al. | ............ | 359/871 |
| 6,058,553 A * | 5/2000 | Tsuyama et al. | ............ | 15/250.003 |
| 6,270,227 B1 * | 8/2001 | Tsuyama | ............ | 359/871 |
| 6,540,193 B1 * | 4/2003 | DeLine | ............ | 248/481 |
| 6,769,781 B2 * | 8/2004 | Tsuyama | ............ | 359/874 |
| 6,918,566 B2 * | 7/2005 | Suzuki et al. | ............ | 248/549 |

* cited by examiner

Primary Examiner—Ricky D. Shafer

(57) ABSTRACT

A motorized tilt actuator assembly comprises one or more threaded jack screws attached to a mirror glass case and traveling along one or more threaded actuator shafts with rotation of the motor. When a jack screw reaches its limit of travel, relative movement between the actuator shaft and the glass case can occur through a slip clutch mechanism during such time as the motor continues to operate. In one embodiment, the relative movement is accommodated by a spherical actuator head rotating in a compressively spring-biased socket. In another embodiment, the relative movement is accommodated by slippage along a friction surface interposed between the actuator shaft and the motor. Manual repositioning of the mirror can be accommodated by slippage of the jack screw threads past the actuator shaft threads, or by a coarse threaded interconnection of the jack screw and the actuator shaft.

9 Claims, 16 Drawing Sheets

VEHICULAR MIRROR WITH SLIP CLUTCH FOR JACK SCREW ACTUATOR

CROSS REFERENCE TO RELATED APPLICATIONS

This application claims the benefit of U.S. provisional application Ser. No. 60/319,823, filed Dec. 30, 2002, which is incorporated herein in its entirety.

BACKGROUND OF INVENTION

1. Field of the Invention

The invention relates to mirrors for automotive vehicles. In one aspect, the invention relates to an improved assembly for mounting a mirror actuator jack screw to a mirror carrier for controlling the vertical and horizontal tilt of the mirror. In one embodiment, the invention relates to a slip clutch applied between each jack screw and the mirror carrier to allow slip between these components when the mirror has reached the end of travel but a drive motor continues to run.

2. Description of the Related Art

Rearview mirrors are standard equipment on automotive vehicles. Frequently, the rearview mirrors can be adjusted by the operator from inside the vehicle through a motorized tilt adjustment mechanism, or tilt actuator, mounted within a mirror system. Via a motor, or a pair of motors, the horizontal and vertical tilt of the mirror is controlled by the threaded engagement of an actuator shaft, also called a jack screw, within a drive nut for each of the horizontal and vertical axes.

Frequently, when the actuator shafts reach their limit of movement, the motor will continue to operate for a period of time. The threaded engagement of the jack screw and the drive nut is therefor configured with a "ratchet" mechanism to allow for relative slippage between the jack screw and the drive nut so that the motor can turn without damage to the motor or the jack screw/drive nut assembly. However, this slippage is typically accompanied by a "clicking" sound as the ratchet mechanism is engaged. This clicking sound is frequently interpreted as a performance defect or the result of poor quality, or it can be interpreted as a failure of the actuator, motivating the vehicle owner to seek maintenance that may be unnecessary. Additionally, in mirrors having a positional memory feature for returning the mirror to a preselected orientation for a particular driver, the slippage between the jack screw and the drive nut will disrupt the memory setting, necessitating the resetting of the preselected orientation for each driver using the vehicle.

A clutch mechanism or release mechanism is frequently incorporated into the tilt actuator to accommodate the continued turning of the motor without damage to the motor or the actuator shafts. This slip clutch is typically provided at the base of the actuator shaft, distal from the interconnection of the actuator shaft to the mirror carrier (which carries the mirror element). The actuator shaft is typically mounted to the mirror carrier in a non-rotatable manner. The slip clutch at the base of the actuator shaft can be complex, and generally requires the actuator shafts to be fixedly incorporated into the tilt actuator, thereby restricting their ready removal from the tilt actuator assembly. The complex mechanism adds cost and inhibits the ready installation and removal of the tilt actuator from the mirror system for replacement or repair.

SUMMARY OF INVENTION

A vehicular mirror system comprises a reflective element having a mounting portion thereon, an actuator operably interconnected to the reflective element for controlling the tilt of the reflective element, wherein the actuator is operable in a normal range of travel, and a clutch associated with the actuator for operation of the actuator in a first mode and a second mode, wherein in the first mode the actuator moves in a normal mode of operation and actuates the tilt of the reflective element, and wherein in the second mode the actuator is placed in an impeded mode of operation and the clutch allows the actuator to slip and prevent damage thereto. One of the mounting portion and the actuator can comprise a socket, and the other of the mounting portion and the actuator can comprise a ball. The ball can be snap-fit within the socket.

The ball can be non-rotatably mounted within the socket, and can comprise at least one projection, wherein the socket comprises at least one slot in register with the at least one projection. The at least one projection can be received within the at least one slot when the ball is received within the socket. A compression member can be mounted around the socket to apply a compression force on the ball. The compression member can comprise a spring wrapped around the periphery of the socket, a ring, a triangular compression ring, or a C-ring.

The socket can have a peripheral groove on an external surface thereof., and compression member can be disposed within the peripheral groove. The compression force can be preselected to apply a sufficient frictional force between the ball and the socket to enable the ball to rotate with respect to the socket during travel in the normal range of movement, but to slip with respect to the socket when the actuator is urged beyond the normal range of travel.

The actuator can comprise a first portion and a second portion, wherein the first portion is non-rotatably mounted to the mounting portion of the reflective element, and the clutch is disposed between the first and second portions to allow movement of the first portion with respect to the second portion during operation in the first mode. The clutch can allow slip between the first and second portions when the actuator is operated in the second mode. The first portion can comprise an elongated member having a first end and a second end. The first end of the first portion can be non-rotatably received by the reflective element.

The second end of the first portion can be received by the second portion, and the second portion can comprise an annular member having an external gear portion which is driven by a motive source. The first portion can be threadingly received by the second portion, wherein driven rotation of the second portion is transferred to the first portion during the normal range of travel. The first portion can be mounted to the second portion by the clutch which slips when the first portion is driven beyond the normal range of travel.

The first portion can have a first bearing surface, the second portion can have a second bearing surface, and the clutch can comprise a spring which frictionally forces the first and second bearing surfaces to travel together during movement in the normal range of travel. The spring can be selected to allow the first and second bearing surfaces to slip with respect to one another when the actuator is urged beyond the normal range of travel.

DETAILED DESCRIPTION

Figure 1:
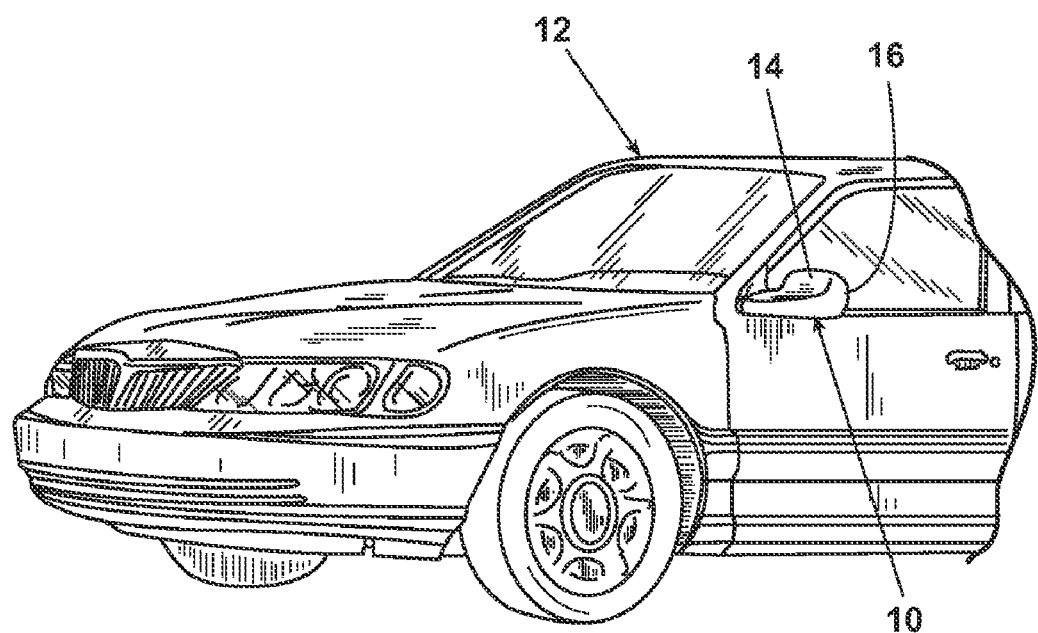
FIG. 1 is a perspective view of a portion of a motor vehicle comprising a mirror system with a tilt actuator and jack screw slip clutches according to the invention.

As illustrated in FIG. 1, an embodiment of a rearview mirror system 10 according to the invention is installed on an automotive vehicle 12 on or near the front of the driver's side door. An identical mirror system can be similarly mounted to the vehicle 12 on the passenger's side. The description of the structure and operation of the mirror system presented hereinafter will be equally applicable to both mirror systems. Although the invention is described herein with respect to one or more exemplary embodiments, the exemplary embodiments of the inventive concepts described herein are not to be considered as limiting, except where the claims expressly state otherwise.

The rearview mirror system described herein comprises several embodiments of an actuator assembly for tilting a reflective element. The actuator assembly comprises one or more jackscrews which operate within a preselected linear range of travel to tilt the reflective element. Unrestricted operation of the actuator assembly resulting in movement of the jackscrew within the preselected linear range of travel is referred to herein as a "normal mode of operation." Restricted operation of the actuator assembly, for example, after the jackscrew is moved to the limit of the preselected linear range of travel, or in the situation in which the jackscrew is prevented from movement within the linear range of travel due, for example, to an obstruction of the movement of the reflective element, is referred to herein as an "impeded mode of operation."

Figure 2:
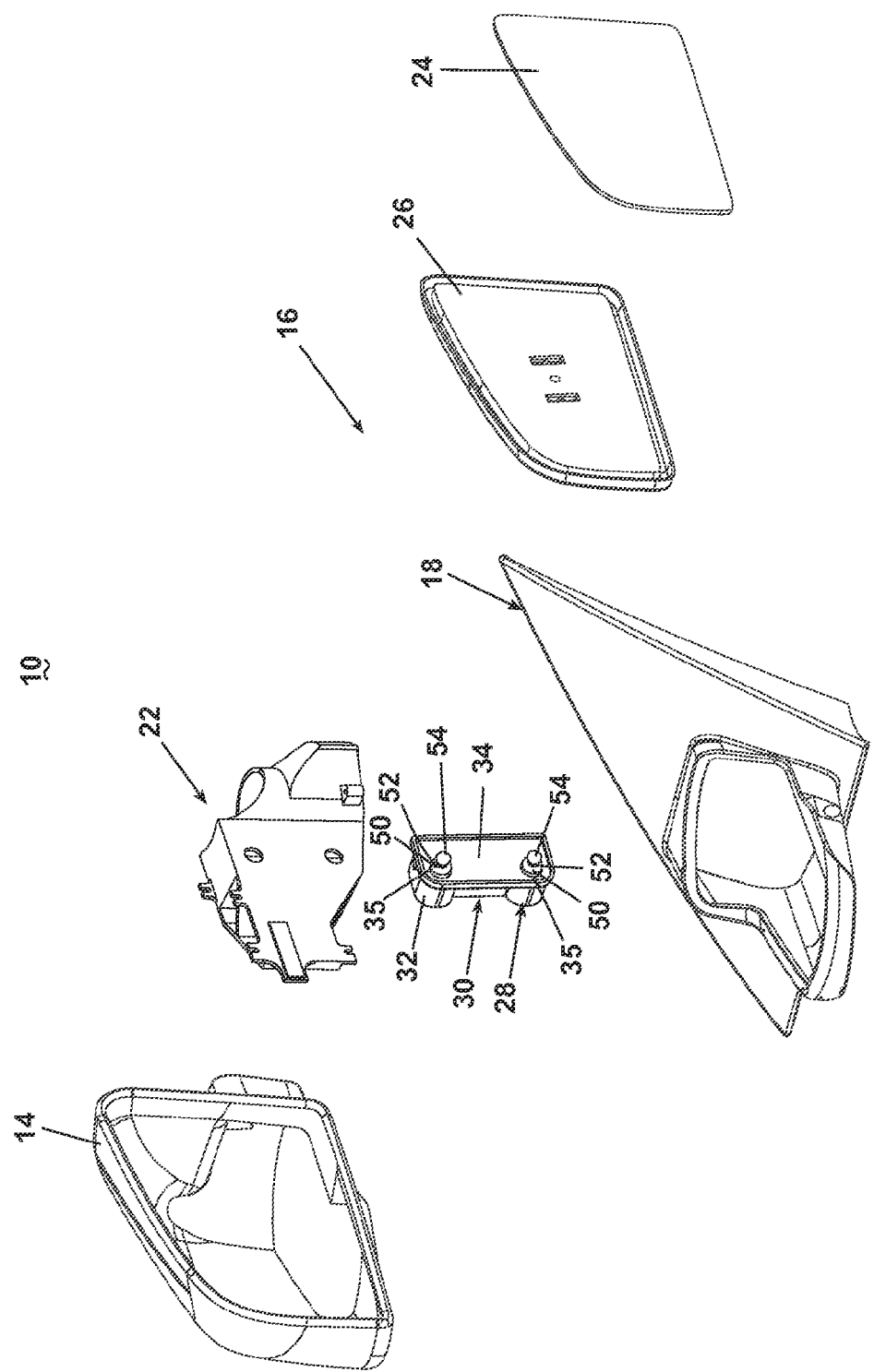
FIG. 2 is a front exploded view of the mirror system of FIG. 1 illustrating the tilt actuator with jackscrews according to the invention.
Figure 3:
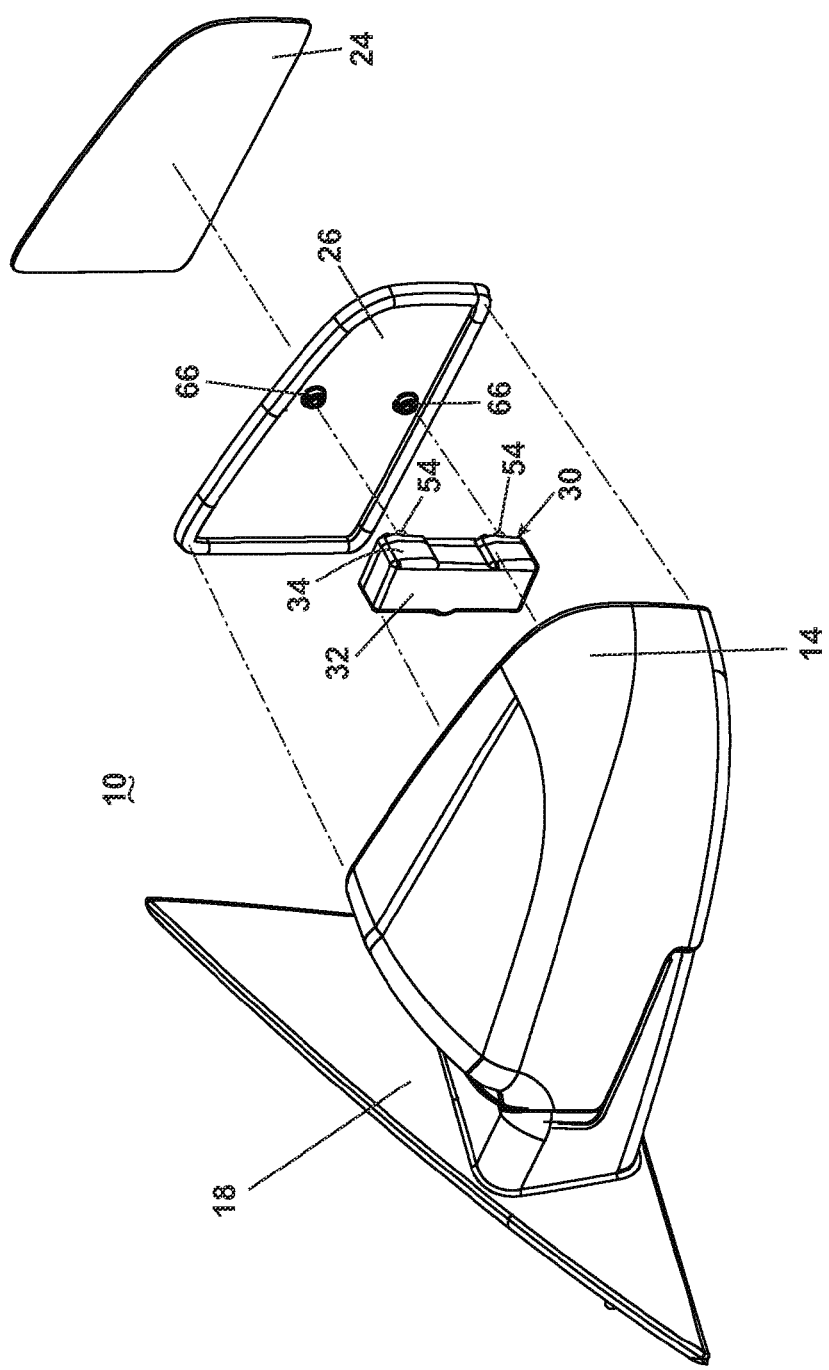
FIG. 3 is a rear exploded view of the mirror system of FIG. 1 illustrating a glass case with sockets for receipt of the jackscrews according to the invention.

As illustrated also in FIGS. 2 and 3, in a first embodiment of the invention, the rearview mirror system 10 comprises an enclosure 14 enclosing a reflective element assembly 16 comprising a reflective element 24 mounted to a glass case 26, a mounting frame 22, and a single motor tilt actuator assembly 28, and a base assembly 18 in cooperative relationship with the mounting frame 22, which system 10 is mounted to the vehicle 12 in a generally well-known manner, and is operably connected to a remote control device (not shown) inside the vehicle through a suitable control linkage, such as a cable or wire harness (not shown). An example of such a rearview mirror system operated by a single motor tilt actuator assembly, and the selected tilting of the reflective element assembly thereby, is illustrated and described in U.S. Patent Applications Ser. No. 60/319,411, filed Jul. 19, 2002, entitled "Single-Motor Actuator With Selectable Multiple-Output Axes And Vehicle Mirror Incorporating Same," and Ser. No. 60/319,176, Filed Apr. 9, 2002, entitled "Single Motor Actuator With Selectable Multiple Output Axle And Vehicle Mirror Incorporating Same," which are incorporated herein by reference. The tilt actuator assembly 28 is fixedly mounted to the mounting frame 22 in a well-known manner. The reflective element 24 is attached in a generally well-known manner to a glass case 26, which is in turn operably connected to the tilt actuator assembly 28 for adjustment of the vertical and horizontal tilt of the reflective element 24 as hereinafter described.

Figure 4:
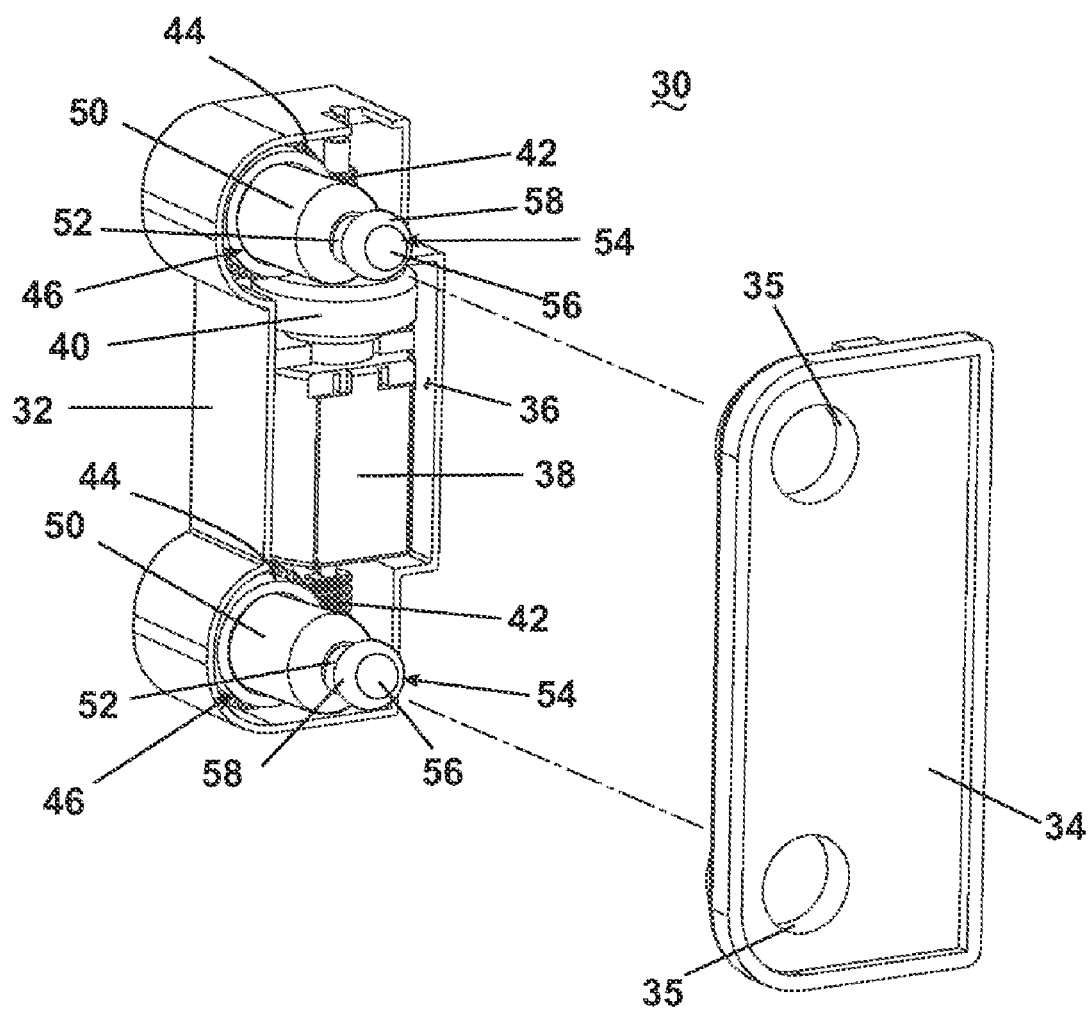
FIG. 4 is a perspective view of the tilt actuator assembly of FIG. 1 with the interior exposed to illustrate the assembly of the jackscrews.
Figure 5:
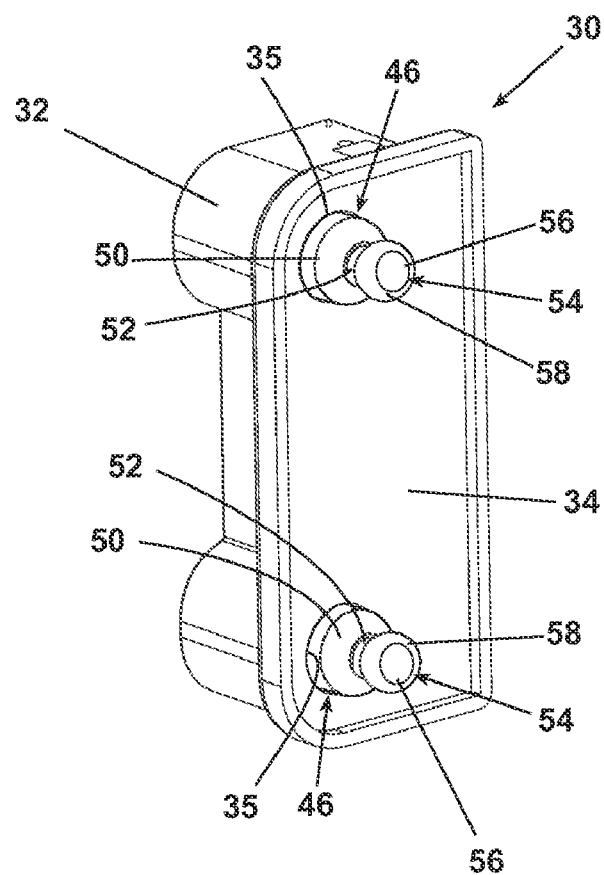
FIG. 5 is a perspective view of the assembled tilt actuator assembly of FIG. 4.

Referring now to FIG. 4, the actuator case 30 comprises a base 32, and a cover 34 having a pair of spaced-apart apertures 35 extending therethrough, defining a chamber 36 containing in cooperative relationship a motor 38, a pair of spaced-apart, generally parallel jackscrews 46 extending through the apertures 35, as illustrated in FIG. 5, a pair of worm gears 42, a pair of drive gears 44, and a clutch assembly 40 for controlling the delivery of torque from the motor 38 to the jackscrews 46, to comprise a single motor mirror tilt actuator assembly 28 for selectively adjusting the vertical and horizontal tilt of the reflective element assembly 16. Each jackscrew 46 is threadably attached in a generally well-known manner to its respective drive gear 44 so that the jackscrew 46 will translate axially inwardly (i.e. retract) and outwardly (i.e. extend) of the tilt actuator assembly 28 when the drive gear 44 is rotated. It should be noted that the tilt actuator assembly 28 is exemplary only, and tilt actuator assemblies having alternative structure and operation can be employed consistent with the inventive concepts described herein. In particular, a tilt actuator assembly comprising a first motor driving a first jackscrew for tilting the mirror about a first axis and a second motor driving a second jackscrew for tilting the mirror about a second axis can be employed.

Figure 6:
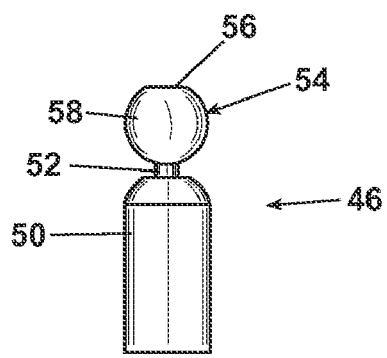
FIG. 6 is a close-up side view of the jack screw of FIG. 4.

As illustrated in FIG. 6, the jackscrews 46 are generally cylindrical, elongated members comprising a cylindrical shaft 50 having an internally threaded coaxial bore, transitioning to a narrow neck 52, to which is attached a truncated spherical head 54. The head 54 comprises a truncated spherical surface 58, and a flat circular surface 56 in diametric juxtaposition to the neck 52 and defining a plane generally orthogonal to the longitudinal axis of the jackscrew 46.

Figure 7:
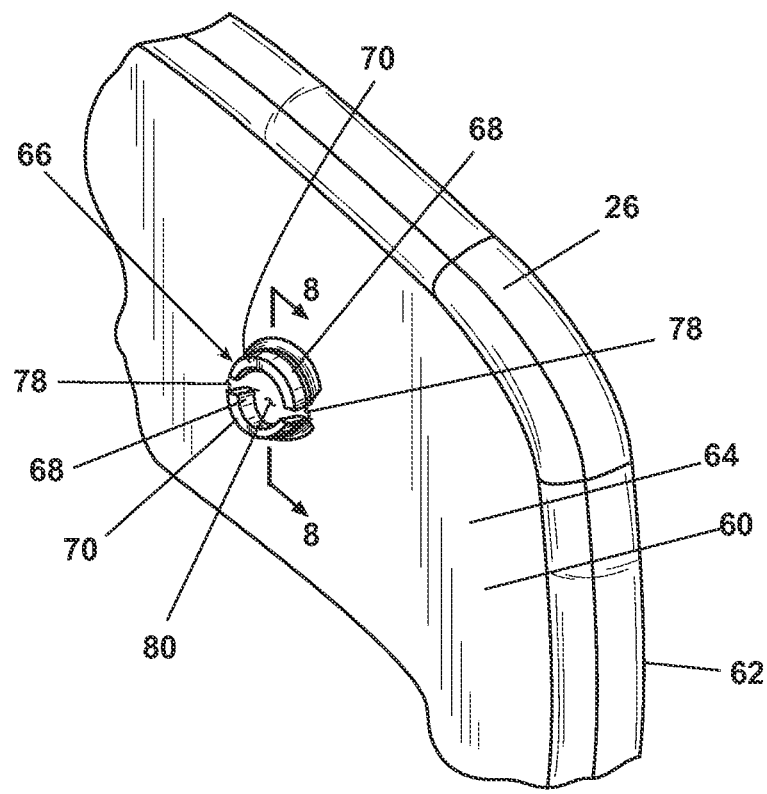
FIG. 7 is a perspective view of a portion of the glass case of FIG. 3 illustrating the sockets for receipt of the jackscrews.
Figure 8:
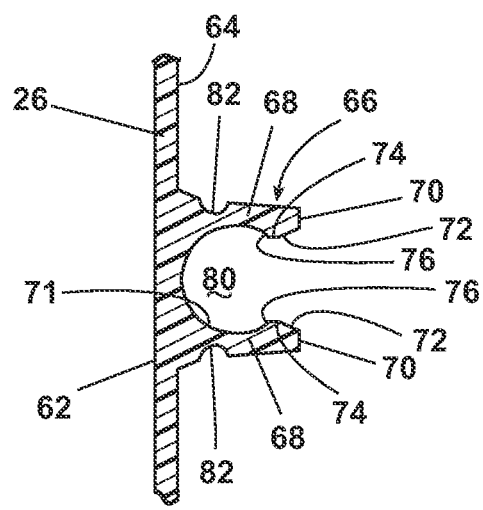
FIG. 8 is a sectional view taken along line 8-8 of FIG. 7.

Referring also to FIGS. 7 and 8, the glass case 26 comprises a generally plate-like body comprising an obverse side 62 to which the reflective element 24 is attached, and a reverse side 60. The reverse side 60 comprises an inner surface 64 from which a pair of spaced-apart sockets 66 extend orthogonally for cooperative register with the jackscrews 56 when the reflective element assembly 16 is operably attached to the tilt actuator assembly 28. Each socket 66 comprises two or more juxtaposed arcuate walls 68 terminating in an arcuate outer rim 70 and separated by a pair of diametrically-opposed head grooves 78. Two arcuate walls 68 are illustrated in FIGS. 7 and 8. Depending inwardly from the outer rim 70 is an inclined surface 72 forming a boss 74 having an inwardly extending annular shoulder 76. The arcuate walls 68 and the bosses 74 defining a generally spherical head cavity 80 having a generally spherical inner surface 71 and a diameter somewhat greater than the diameter of the head 54. Extending circumferentially around the exterior of the arcuate walls 68 is a ring groove 82, illustrated in FIG. 8 as adjacent the inner surface 64.

Figure 9:
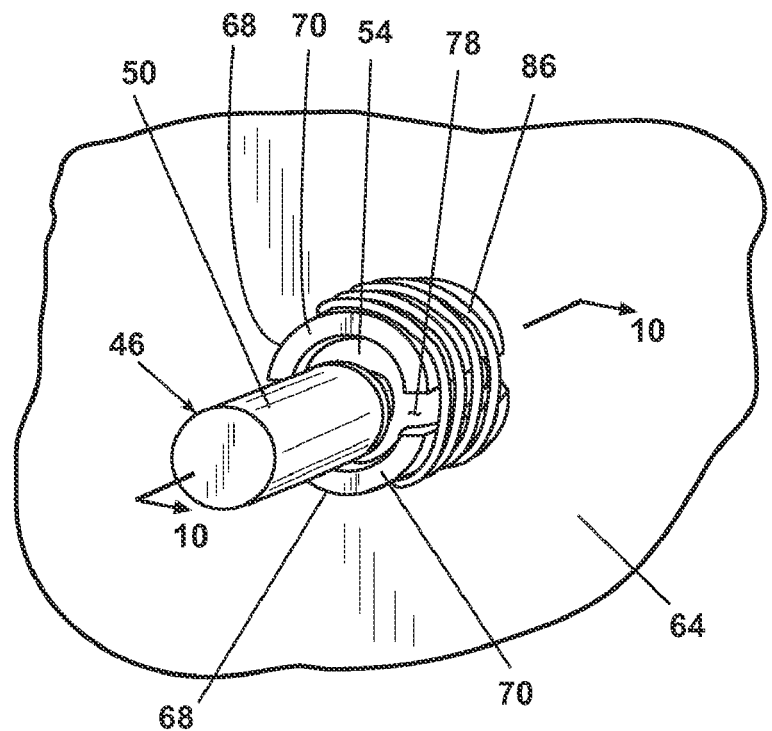
FIG. 9 is a perspective view of a portion of a jack screw and a socket according to a first embodiment of the invention.
Figure 10:
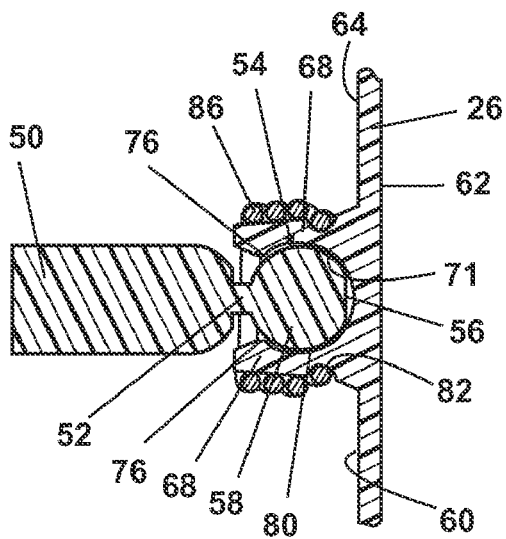
FIG. 10 is a sectional view taken along line 10-10 of FIG. 9.

Referring now to FIGS. 9 and 10, the head 54 of the jackscrew 46 is inserted into the socket 66 in a "ball and socket" configuration so that the spherical surface 58 is in slidable register with the spherical inner surface 71. The head 54 will be retained in the head cavity 80 by the annular shoulders 76 but can pivot and rotate relative to the glass case 26. In a first embodiment illustrated in FIGS. 9 and 10, a compression element comprising a compression spring 86 is snap fit circumferentially around the arcuate walls 68 and is adapted for providing a radially inward compressive force to the arcuate walls 68. A portion of the compression spring 86 is received in the ring groove 82 to retain the compression spring 86 in place around the arcuate walls 68. The compression spring 86, the arcuate walls 68, and the head 54 are cooperatively adapted so that friction between the spherical inner surface 71 and the spherical surface 58 will prevent the jackscrews 46 from rotating relative to the sockets 66 so that the jackscrews 46 will translate coaxially with the rotation of the drive gears 44 during a normal range of travel of the jackscrews 46 between the retracted and extended positions. However, the compression spring 86, the arcuate walls 68, and the head 54 are also cooperatively adapted so that, when the jackscrews 46 reach the inner or outer limits of their movement, the friction between the spherical inner surface 71 and the spherical surface 58 will be overcome and the head 54 will rotate within the head cavity 80. The frictional force between this vertical inner surface 71 and the spherical surface 58 can be selectively adjusted by adjusting the compressive force exerted by the compression spring 86. A compression spring 86 having a low compressive force will provide a low frictional force between this vertical inner surface 71 and the spherical surface 58. Conversely, a compression spring 86 having a high compressive force will provide a high frictional force between the vertical inner surface 71 and the spherical surface 58. It will be recognized that the ring groove 82 can be positioned at any location along the arcuate walls 68 between the inner surface 64 and the outer rim 70 consistent with the function of the compression element described herein.

Figure 11:
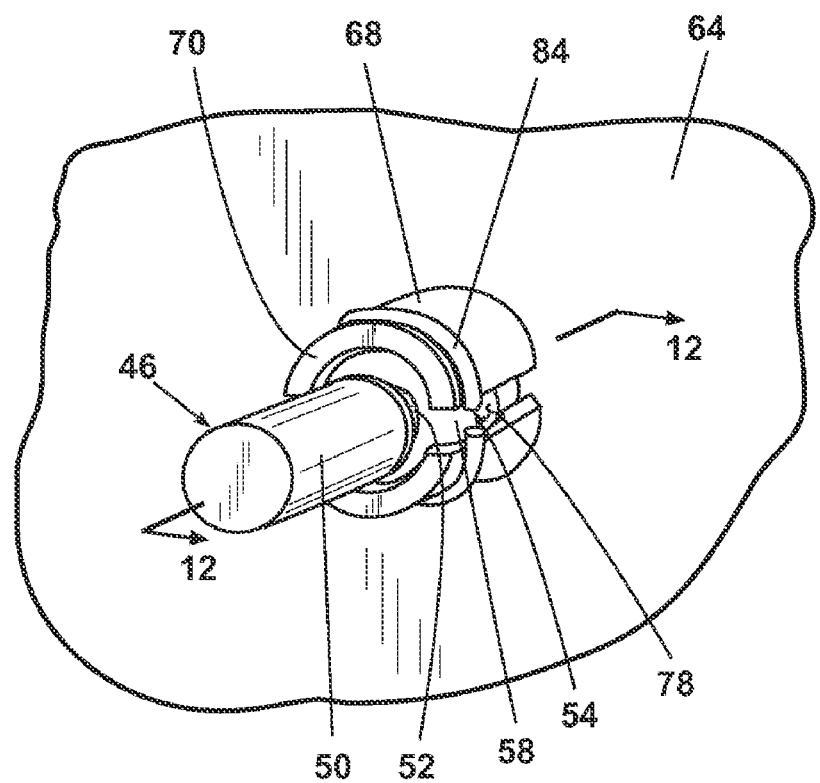
FIG. 11 is a perspective view of a portion of a jack screw and a socket according to a second embodiment of the invention.
Figure 12:
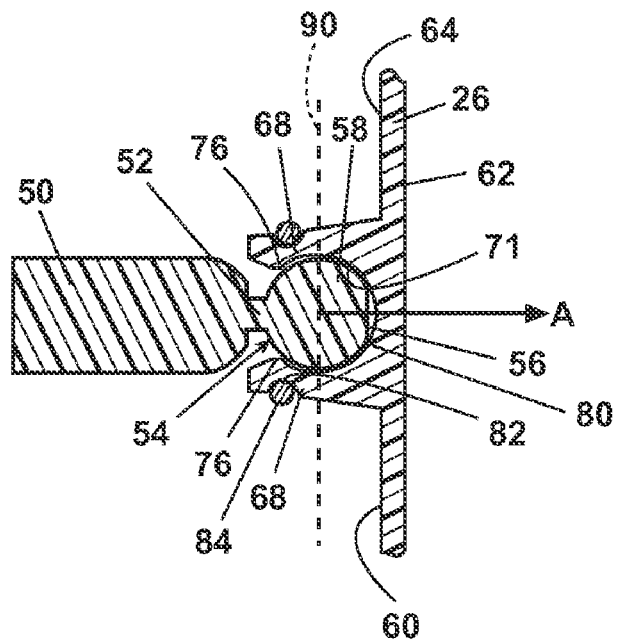
FIG. 12 is a sectional view taken along line 12-12 of FIG. 11.

FIGS. 11 and 12 illustrate a second embodiment in which the compression element is a compression ring 84 comprising a generally conventional C-shaped ring retained in a ring groove 82 and applying a radially inward compressive force to the arcuate walls 68. A diametric plane 90 is illustrated in FIG. 12 which lies parallel to the inner surface 64 and bisects the head 54. In this embodiment, the ring groove 82 is preferably adjacent the arcuate outer rim 70 on the side of the plane 90 away from the inner surface 64, which will provide a more readily controlled compressive force to the arcuate walls 68. The compression of the arcuate walls 68 by the compression ring 84 will urge the shoulders 76 together, which will create a force on the head 54 tending to urge the head 54 into the head cavity 80, as illustrated in FIG. 12 by the arrow "A". The compression ring 84, the arcuate walls 68, and the head 54 are cooperatively adapted so that friction between the spherical inner surface 71 and the spherical surface 58 will prevent the jackscrews 46 from rotating relative to the sockets 66 so that the jackscrews 46 will translate coaxially with the rotation of the drive gears 44 during a normal range of travel of the jackscrews 46 between the retracted and extended positions. However, the compression ring 88, the arcuate walls 68, and the head 54 are also cooperatively adapted so that, when the jackscrews 46 reach the inner or outer limits of their movement, the friction between the spherical inner surface 71 and the spherical surface 48 will be overcome and the head 54 will rotate within the head cavity 80.

Figure 13:
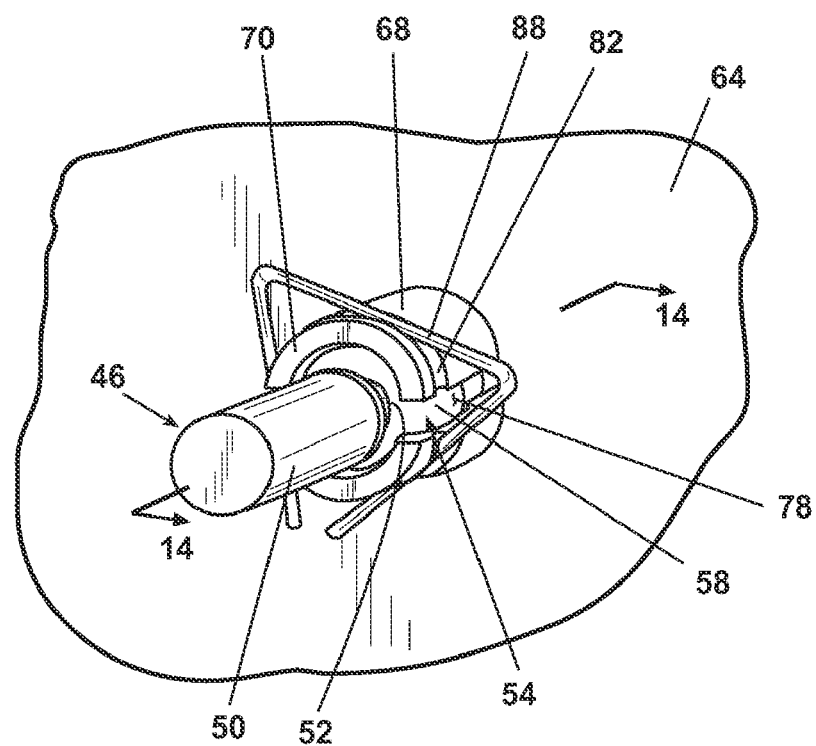
FIG. 13 is a perspective view of a portion of a jack screw and a socket according to a third embodiment of the invention.
Figure 14:
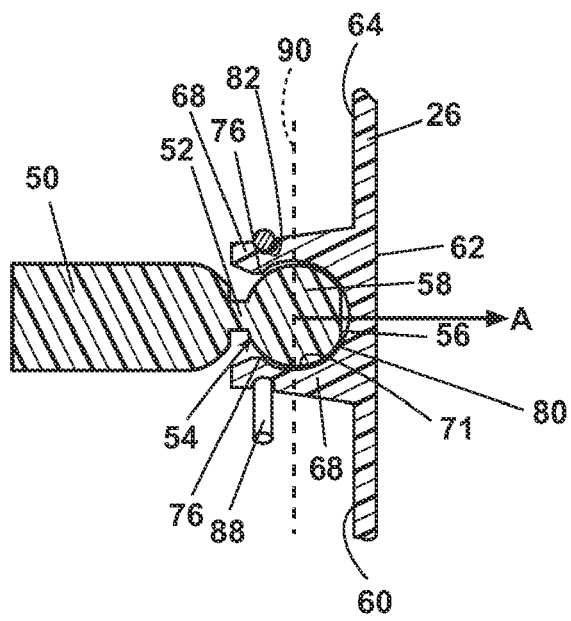
FIG. 14 is a sectional view taken along line 14-14 of FIG. 13.

FIGS. 13 and 14 illustrate a third embodiment in which the compressive force acting radially inwardly on the arcuate walls 68 is provided by a compression triangle 88 which is similarly retained in a ring groove 82 adjacent the arcuate outer rim 70, and operates as previously described with respect to the first and second embodiments. The compression of the arcuate walls 68 by the compression triangle 88 will urge the shoulders 76 together, which will create a force on the head 54 tending to urge the head 54 into the head cavity 80, as illustrated in FIG. 14 by the arrow "A"

In each embodiment, the truncation of the head 54 forming the flat surface 56 can be selected to provide a spherical surface 58 having a selected area, thereby providing the desired frictional resistance between the spherical surface 58 and the inner spherical surface 71. Alternatively, the head 54 can be untruncated. As well, it is within the scope of the invention to provide the radially inward compressive force to the arcuate walls 68 through other compression elements in addition to those illustrated and described herein.

The jackscrews 46 are attached to the glass case 26 by snap-fitting the heads 54 into the sockets 66. The arcuate walls 68 will be flexed radially outwardly as the head 54 is inserted into the head grooves 78, and will flexibly return radially inwardly as the head 54 moves past the annular shoulders 76. Depending upon the compressive force exerted on the arcuate walls 68, the heads 54 can be inserted into the sockets 66 with or without the compression elements installed. It is anticipated that the heads 54 will typically be inserted into the sockets 66 without the compression elements installed, and that the compression elements will be installed after the heads 54 are inserted into the sockets 66.

Figure 15:
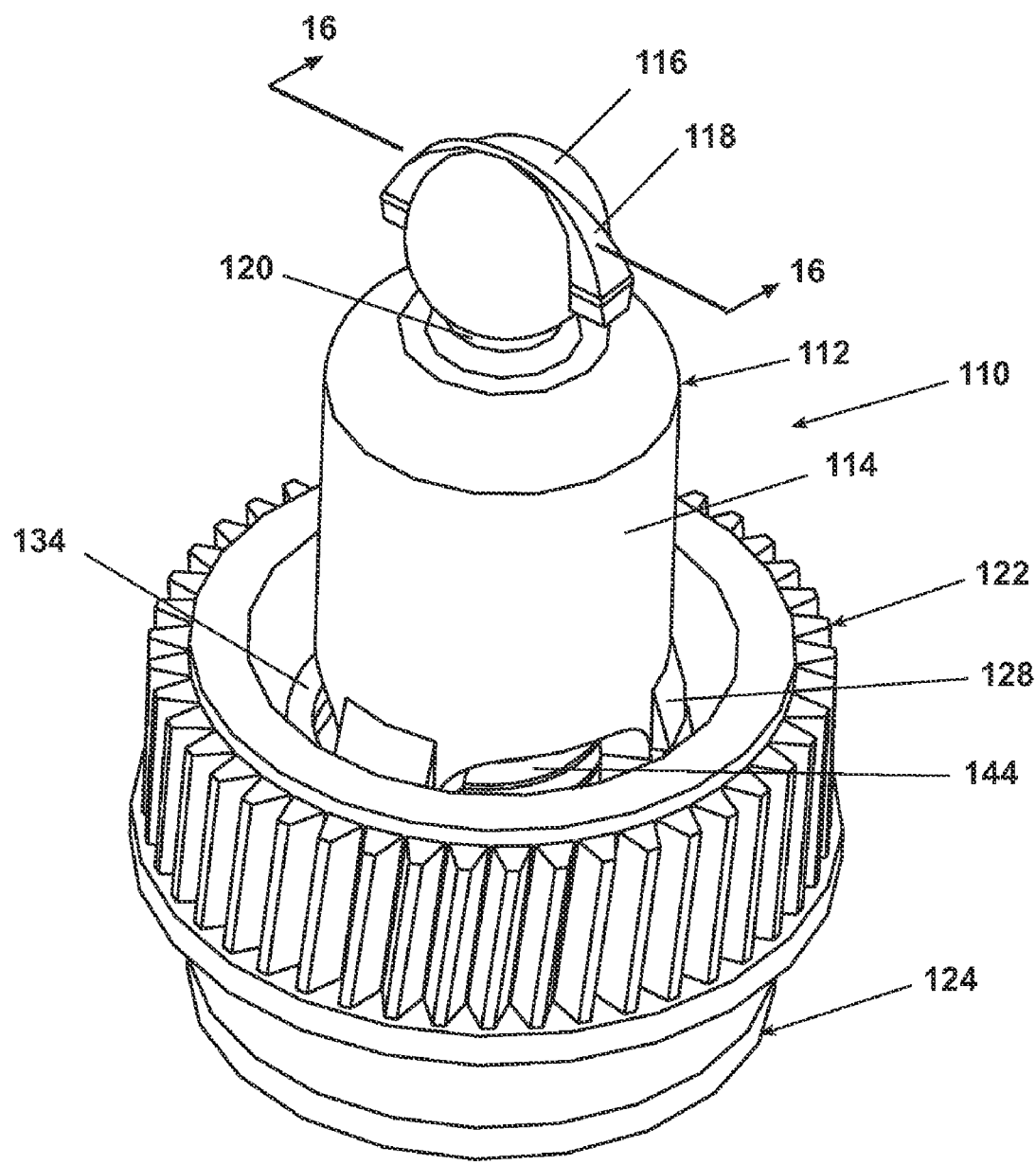
FIG. 15 is a close-up perspective view of a first alternate embodiment of an assembly comprising a jackscrew and a drive gear operably connected through a clutch plate assembly.
Figure 16:
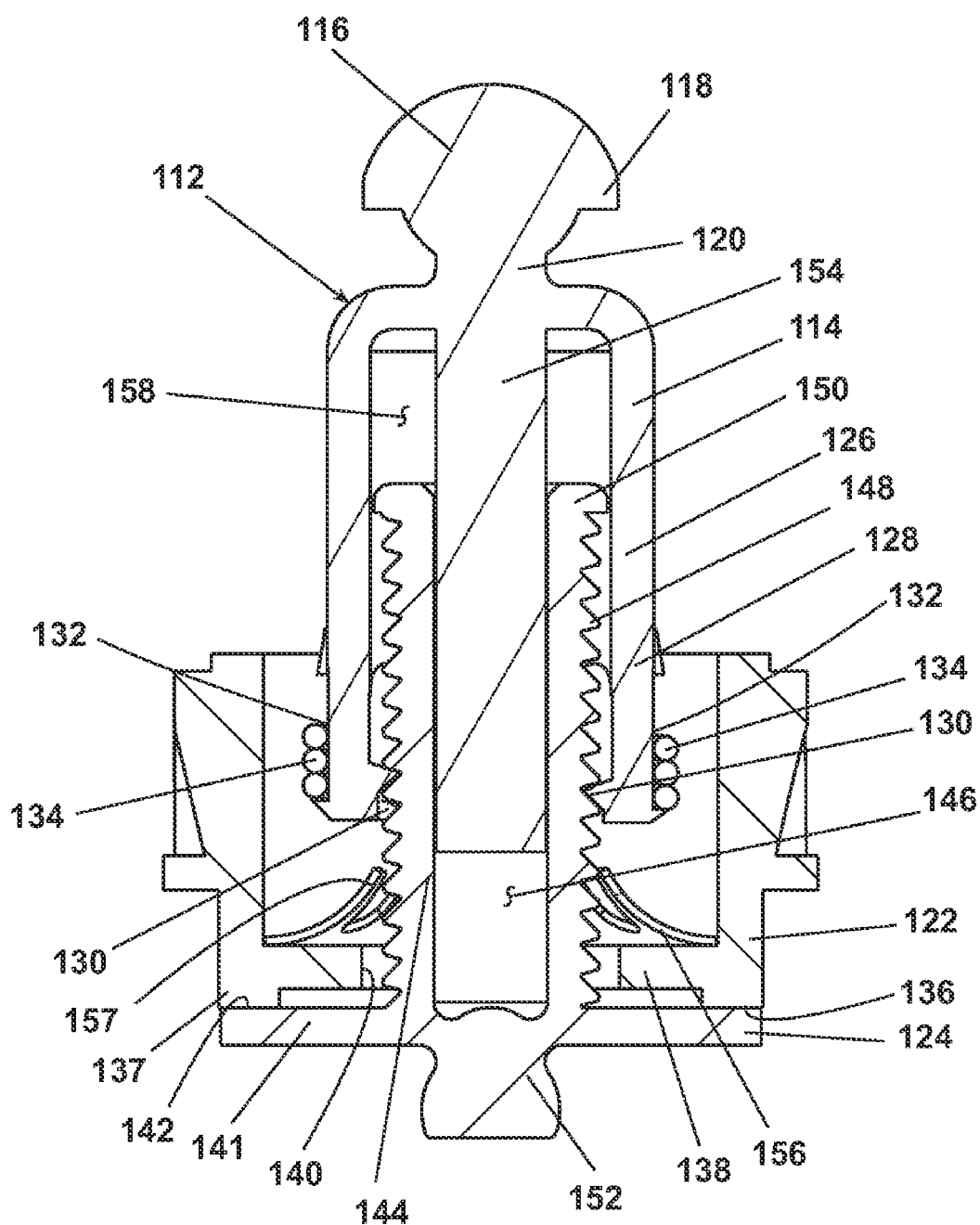
FIG. 16 is a cross-sectional view of the jack screw assembly of FIG. 15 taken along line 16-16.
Figure 17:
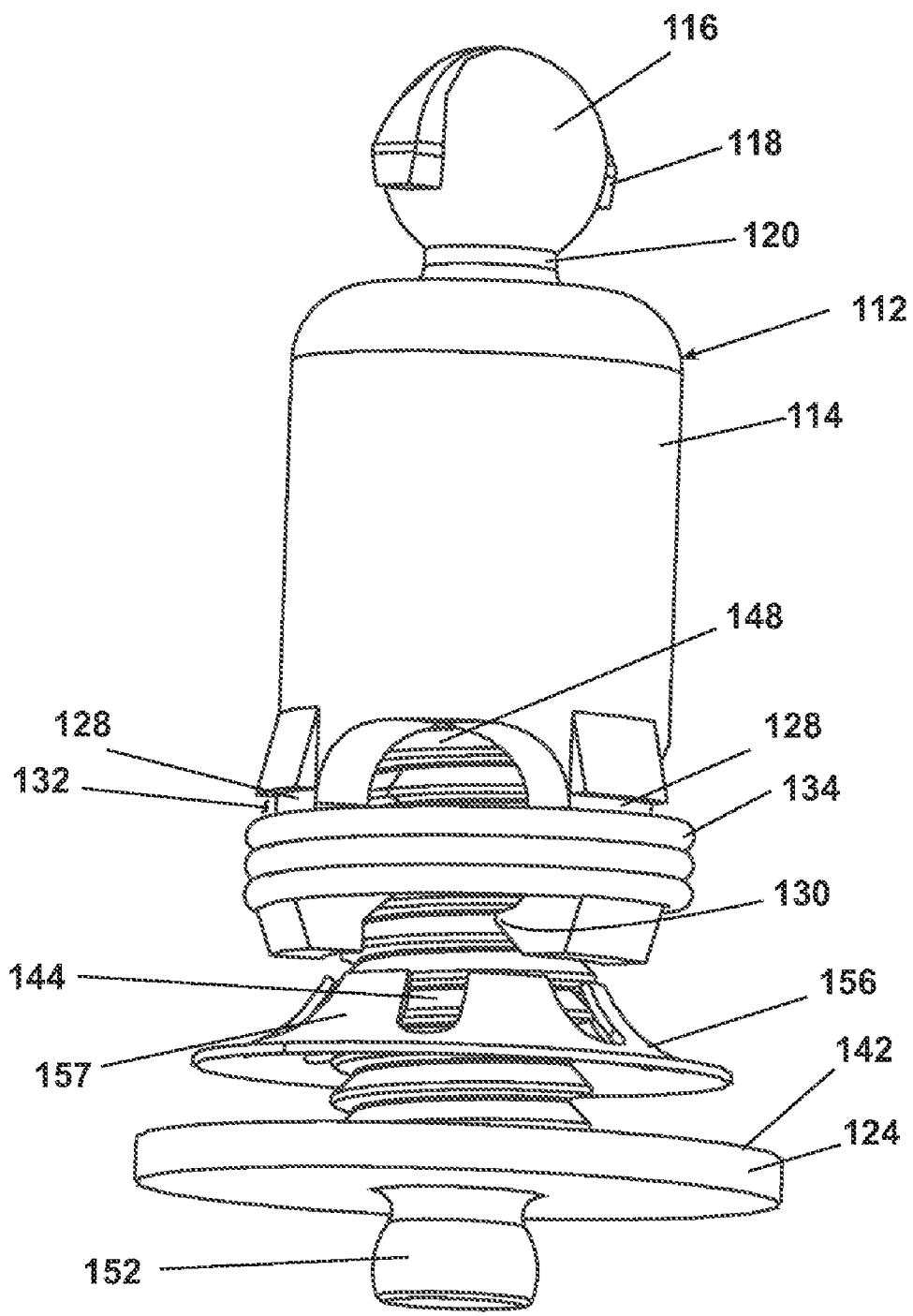
FIG. 17 is a close-up perspective view of the assembly illustrated in FIG. 15 with the drive gear removed for clarity.

FIGS. 15, 16, and 17 illustrate a second embodiment of the jackscrew slip clutch assembly. A jackscrew actuator 110 comprises a jackscrew 112, a drive gear 122, and clutch plate assembly 124. The jackscrew 112 comprises an elongated hollow shaft 114 comprising an annular wall 126 and a cylindrical center shaft 154 coaxial therewith defining an annular bore 158. The annular wall 126 terminates in a plurality of annular fingers 128 having radially inwardly-extending teeth 130 extending into the annular bore 158. Extending circumferentially around the outer surface of the annular fingers 128 is a spring channel 132 for retaining a helical spring 134 therein. The jackscrew 112 comprises a spherical head 116 connected to the shaft 114 by a narrowed neck 120. The head 116 is bisected by a projection, illustratively shown as a blade 118, adapted for insertion into a mating socket and slot (not shown) in the glass case 26 as is generally well-known in the art.

The drive gear 122 comprises a generally cylindrical body comprising an annular wall with radially outwardly-extending teeth for operable register with a worm gear 42 as is generally well-known in the art. The drive gear 122 has a circular wall 138 displaced inwardly somewhat from one end of the drive gear 122 to form an annular ring wall 137 defining an annular rim 136. A circular shaft aperture 140 extends coaxially through the circular wall 138.

The clutch plate assembly 124 comprises an irregularly-shaped body having a planar circular clutch plate 141 defining a circular clutch face 142. Extending coaxially from the clutch face 142 is an annular, elongated threaded shaft 144 comprising an annular wall 150 having external threads 148 and defining a center bore 146 coaxial with the circular clutch face 142. The threads 148 are adapted for threadable register with the teeth 130 so that as the clutch plate assembly 124 is rotated about its longitudinal axis, the jackscrew 112 will translate longitudinally relative to the clutch plate assembly 124. The annular wall 150 is received in the annular bore 158, and the center shaft 154 is slidably received in the center bore 146.

Extending coaxially opposite the circular clutch face 142 is a mounting nipple 152 which is snap-fit into a mating receptacle (not shown) in the base 32 of the actuator case 30 for rotation of the clutch plate assembly 124 about its longitudinal axis relative to the base 32. A clutch spring 156 is a circular body comprising a plurality of upwardly-directed fingers 157 extending radially inwardly and adapted for threadable register with the threaded shaft 144.

The jackscrew actuator 110 is assembled by inserting the threaded shaft 144 into the shaft aperture 140 so that the clutch face 142 is in slidable register with the annular rim 136 at the perimeter of the clutch face 142. The clutch spring 156 is threadably installed over the threaded shaft 144 until it contacts the circular wall 138 to urge the annular rim 136 against the clutch face 142. The contact force between the annular rim 136 and the clutch face 142 can be selectively adjusted in proportion to the degree to which the spring 156 is threaded onto the threaded shaft 144. The jackscrew 112 is then installed by inserting the center shaft 154 into the center bore 146 and the threaded shaft 144 into the annular bore 158 so that the teeth 130 threadably engage the threads 148. The spring 134 is received in the spring channel 132 to urge the fingers 128 radially inwardly. The assembly is then snap fit into the base 132 so that the drive gear 122 engages the worm gear 42 and the head 116 engages the glass case 26.

As the drive gear 122 is rotated by the worm gear 42, friction between the annular rim 136 and the clutch face 142 will urge the rotation of the clutch plate assembly. The threaded shaft 144 will rotate relative to the jackscrew 112, which is prevented from rotating by the connection of the head 116 and blade 118 to the glass case 26. Thus, the jackscrew 112 will be translated along the threaded shaft 144 to tilt the glass case 26 along an axis. If the jackscrew 112 reaches its limit of travel, the clutch plate assembly 124 will be prevented from further rotation while the drive gear 122 will continue to rotate with the rotation of the worm gear 42. The friction force between the annular rim 136 and the clutch face 142 will be exceeded, thereby enabling the motor 38 and the drive screw 122 to continue rotating without damage to either part. Similarly, the fingers 128 can flex radially-outwardly to enable the teeth 130 to move outwardly and over the threads 148 as the drive gear 122 and the threaded shaft 144 continue to rotate in the case where the friction force between the annular rim 136 and the clutch face 142 may not be exceeded.

The jackscrew 112 can also translate relative to the threaded shaft 144 if sufficient force is applied to the jackscrew 112, such as by an external impact applied to the glass case 26. The fingers 128 are urged inwardly by the spring 134, but can flex radially outwardly against the compressive force of the spring 134 as the teeth 130 travel past the threads 148 if sufficient force is applied to the jackscrew 112.

Figure 18:
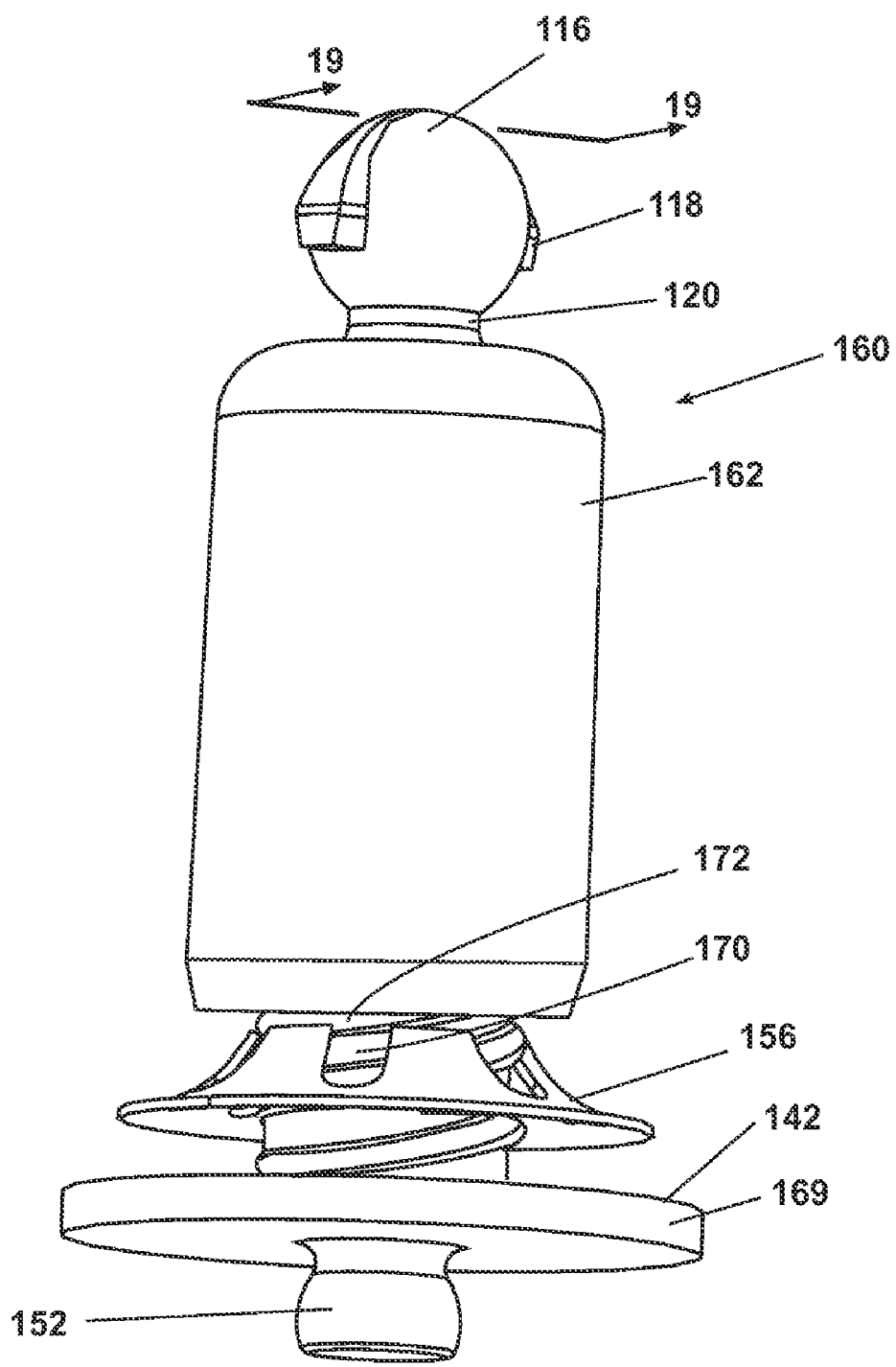
FIG. 18 is a close-up perspective view of a second alternate embodiment of an assembly comprising a jackscrew and a drive gear operably connected through a clutch plate assembly, with the drive gear removed for clarity.
Figure 19:
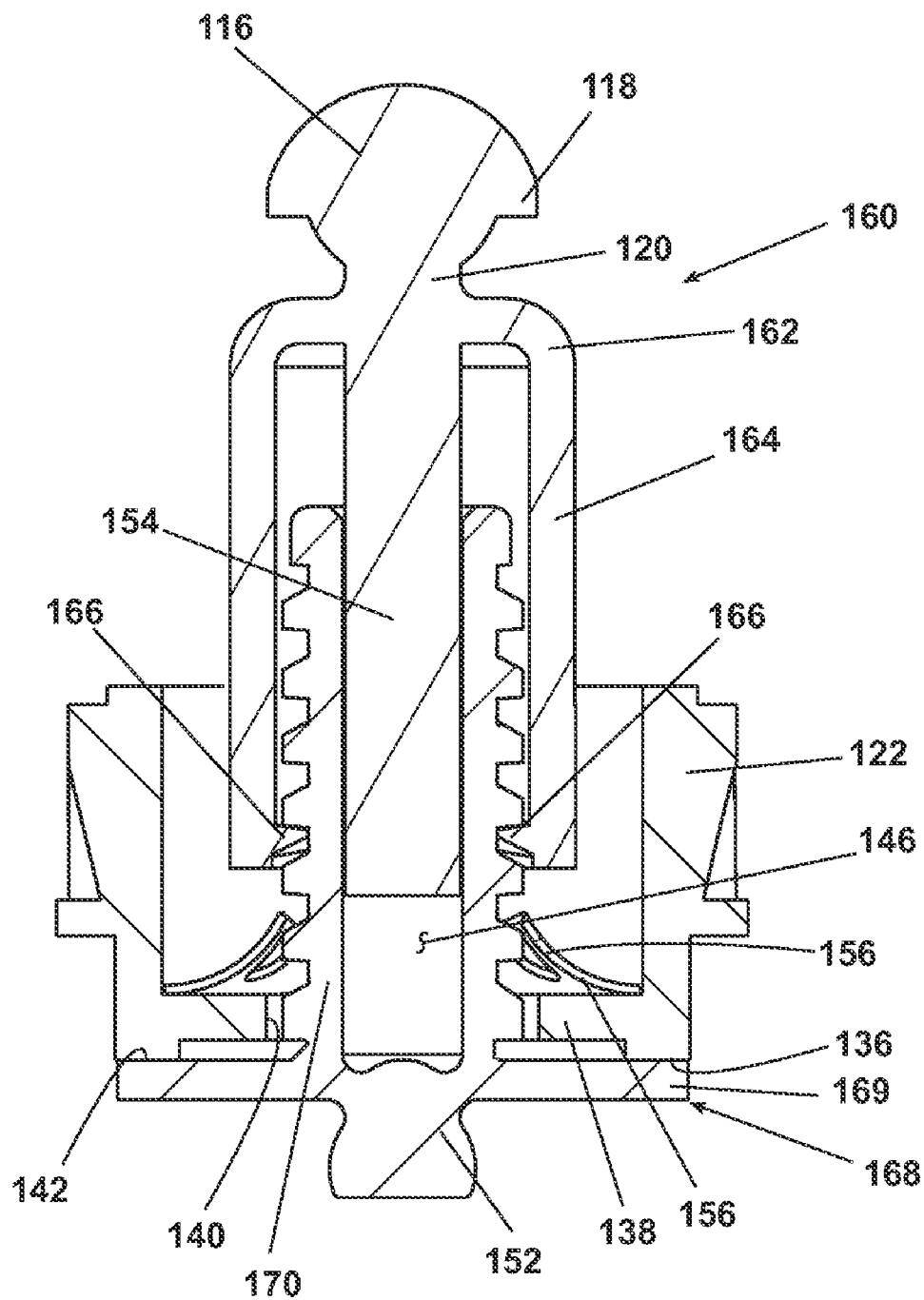
FIG. 19 is a cross sectional view of the jack screw assembly of FIG. 18 with the drive gear included taken along line 19-19.

FIGS. 18 and 19 illustrate a third embodiment of the jackscrew actuator 160 which is similar in many respects to the jackscrew actuator 110 described heretofore. The jackscrew actuator 160 comprises a shaft 162 comprising an annular wall 164 terminating in a single, radially inwardly-extending tooth-like thread 166. The clutch plate assembly 168 comprises a circular clutch plate 169 and a threaded shaft 170 having threads 172 which threadably engage the thread 166 for longitudinal translation of the shaft 162 relative to the clutch plate assembly 168 with rotation of the clutch plate assembly 168 in a manner similar to the previously described second embodiment. If the jackscrew reaches its limit of travel, the drive gear 122 will continue to rotate while the clutch plate assembly 168 will be prevented from further rotation, and the friction between the annular rim 136 of the drive gear 122 and the clutch face 142 will be exceeded.

The pitch of the thread 166 and the threads 172 are adapted so that, if sufficient force is applied to the jackscrew, the threaded shaft 170 will be urged to rotate. Preferably, the pitch of the threads 172 is 12.7 mm/thread so that the shaft 162 will translate 12.7 mm with one complete rotation of the shaft 170. If the force applied to the jackscrew is inward, i.e. a force applied to the glass case 20 tending to push the jackscrew toward the circular wall 138 of the drive gear 122, the clutch face 142 will be urged away from the annular rim 136, thereby enabling the clutch plate assembly 168 to rotate relative to the drive gear 122. With this embodiment, gearing reduction is necessary so that the shaft 170 will turn more slowly, thereby slowing the linear translation of the shaft 162.

Figure 20:
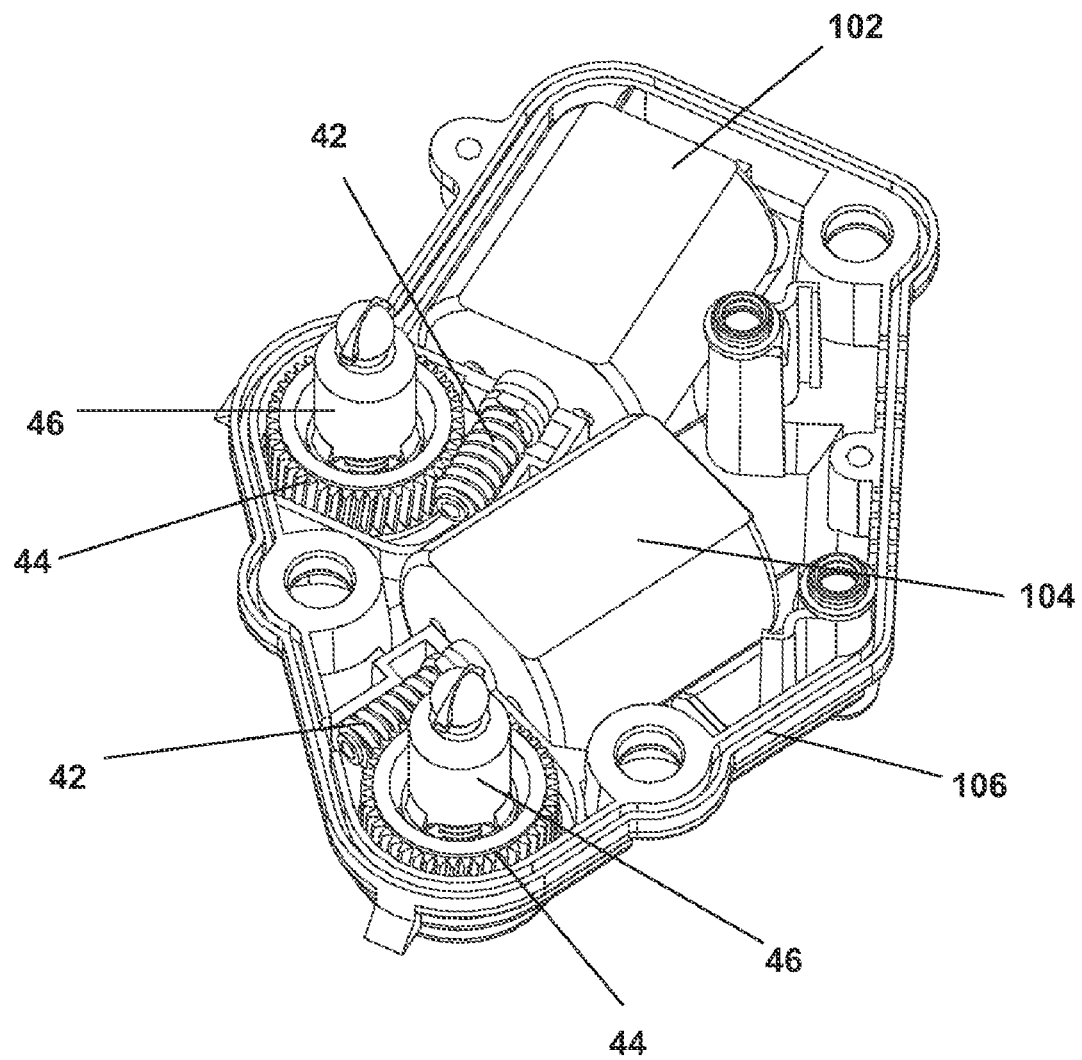
FIG. 20 is a perspective view of an alternate embodiment of the tilt actuator assembly of FIG. 1 with the interior exposed to illustrate an assembly comprising a pair of actuator motors and jackscrews according to the invention.

Although the invention has been described with respect to a single motor mirror tilt actuator 28, it is within the scope of the invention that the tilt actuator 28 can comprise a multiple motor tilt actuator, such as the dual motor tilt actuator assembly 100 illustrated in FIG. 20 as comprising a first motor 102 for tilting the reflective element assembly 16 about a first axis and a second motor 104 for tilting the reflective element assembly 16 about a second axis, and assembled within a housing 106. With the dual motor tilt actuator assembly 100, the clutch assembly 40 is eliminated. The first motor 102 will be operatively connected to a first actuator assembly comprising a jackscrew 46, a worm gear 42, and a drive gear 44 as is generally well-known in the art.

The second motor 104 will be similarly operatively connected to a second actuator assembly comprising a jackscrew 46, a worm gear 42, and a drive gear 44.

Regardless of the particular embodiment, the operation of the jackscrews 46, 112 is generally the same in that, during the normal mode of operation, the head 54, 116 on each embodiment of the jackscrew 46, 112 does not rotate within the corresponding socket 66 (because of the compression element thereon illustrated by example with reference numerals 84, 86, 88, or because of the engagement of the blade 118 with a mating receptacle). However, when the mirror system is placed in an impeded mode of operation, such as when the actuator assembly encounters a mechanical stop with respect to the normal range of tilting travel about either the horizontal or vertical axes, or when the reflective element assembly 16 is prevented from movement, i.e., where the motor 38 continues to run when the reflective element assembly 16 encounters a mechanical stop preventing further movement in that direction, the head 54 will then turn within the socket 66 (i.e., the friction between the head 54 and the socket 66 caused by the compression elements 84, 86, 88 is overcome by the mechanical stop encountered by the mirror carrier), or the drive gear 122 will rotate relative to the clutch plate assembly 124,168 (i.e., the friction between the annular rim 136 and the clutch face 142 is overcome by the mechanical stop encountered by the mirror carrier), or the shaft 114 will move along the center shaft 154.

Figure 21:
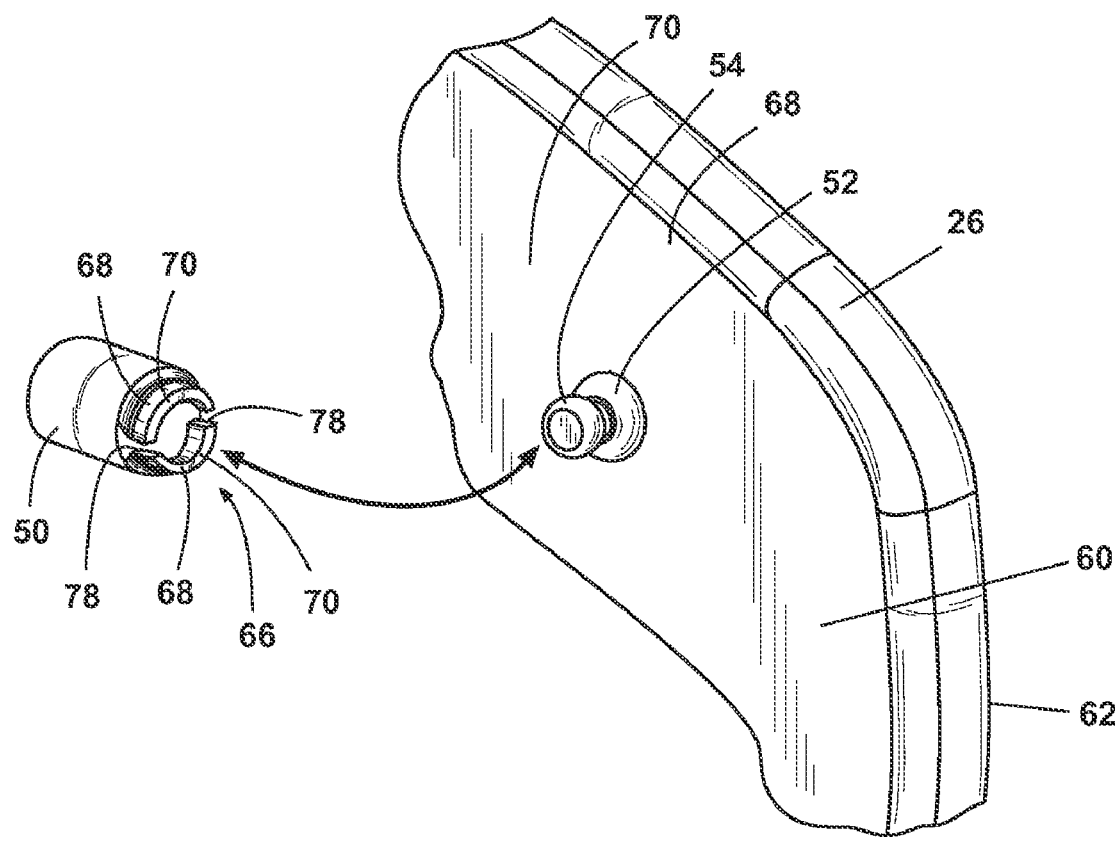
FIG. 21 is an exploded view of a portion of the tilt actuator assembly of FIGS. 2-14 illustrating an alternate embodiment of the ball and socket assembly.

FIG. 21 illustrates an alternate embodiment of the tilt actuator assembly of FIGS. 2-14 in which the ball and socket are switched between the reflective element assembly and the actuator assembly. Thus, the glass case 26 of the reflective element assembly 16 comprises the spherical head 54 and the shaft 50 of the jack screw 46 terminates in the socket 66. The coupling of the spherical head 54 with the socket 66 is identical to that described above for the jack screw 46 comprising the spherical head 54 and the glass case 26 of the reflective element assembly 16 comprising the socket 66.

The novel jackscrew slip clutch illustrated and described herein moves the slip clutch mechanism from the drive gear/jackscrew interface to the jackscrew/glass case interface. Significantly, the "clicking" or "ratcheting" sound of the prior art mechanism that occurs when a jackscrew reaches its limit of travel is eliminated. The slip clutch mechanism described herein also simplifies the structure for transforming torque from the drive gear into linear movement of the jackscrew. This also enables the jackscrew to be readily slidably or threadably interconnected to the drive gear by inserting the jackscrew through the aperture in the actuator case cover so that the jackscrew can be added to the tilt actuator assembly after the tilt actuator assembly has been installed in the mirror system. The simplified jackscrew slip clutch results in easier assembly of the tilt actuator and mirror assemblies, and easier removal of the tilt actuator assembly for replacement and repair. Finally, the simplified slip clutch mechanism is less costly to produce and assemble, thereby reducing the cost of the mirror system.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:

1. A vehicular mirror system comprising:
   a reflective element comprising a first slip clutch element comprising one of a ball and a socket and having a mounting portion thereon, the socket having a peripheral groove on an external surface thereof;
   an actuator assembly comprising a second slip clutch element comprising the other of a ball and a socket and operably interconnected to the reflective element for controlling a tilt of the reflective element, wherein the actuator assembly is operable in a normal mode of operation, the ball and socket comprising a slip clutch; and
   a compression element mounted around the socket having the ball cradled therein to apply a compression force on the ball for operation of the actuator assembly in a first mode and a second mode, wherein in the first mode the actuator assembly moves in the normal mode of operation and actuates the tilt of the reflective element, and wherein in the second mode the actuator assembly is placed in an impeded mode of operation and the ball and socket allows the actuator assembly to slip.

2. The vehicular mirror system according to claim 1, wherein the ball is snap-fit within the socket.

3. The vehicular mirror system according to claim 2, wherein the ball is non-rotatably mounted within the socket.

4. The vehicular mirror system according to claim 1, wherein the compression member comprises a spring wrapped around the periphery of the socket.

5. The vehicular mirror system according to claim 1, wherein the compression force is preselected to apply a sufficient frictional force between the ball and the socket to impede the rotation of the ball with respect to the socket during travel in a normal range of travel, but to slip with respect to the socket when the actuator assembly is urged beyond the normal range of travel.

6. A vehicular mirror system comprising:
   a reflective element comprising a first slip clutch element comprising one of a ball and a socket and having a mounting portion thereon, the ball comprising at least one projection, and the socket comprising at least one slot in register with the at least one projection;
   an actuator assembly comprising a second slip clutch element comprising the other of a ball and a socket and operably interconnected to the reflective element for controlling a tilt of the reflective element, wherein the actuator assembly is operable in a normal mode of operation, the ball and socket comprising a slip clutch; and
   a compression element mounted around the socket having the ball cradled therein to apply a compression force on the ball for operation of the actuator assembly in a first mode and a second mode, wherein in the first mode the actuator assembly moves in the normal mode of operation and actuates the tilt of the reflective element, and wherein in the second mode the actuator assembly is placed in an impeded mode of operation and the ball and socket allows the actuator assembly to slip.

7. The vehicular mirror system according to claim 6, wherein the at least one projection is received within the at least one slot when the ball is received within the socket.

8. The vehicular mirror system according to claim 6, wherein the socket has a peripheral groove on an external surface thereof.

9. The vehicular mirror system according to claim 8, wherein the compression member is disposed within the peripheral groove.

* * * * *

UNITED STATES PATENT AND TRADEMARK OFFICE
CERTIFICATE OF CORRECTION

PATENT NO.       : 7,370,985 B2                                    Page 1 of 1
APPLICATION NO.  : 10/707567
DATED            : May 13, 2008
INVENTOR(S)      : Ian Boddy et al.

It is certified that error appears in the above-identified patent and that said Letters Patent is hereby corrected as shown below:

On the Title Page (73) in the Assignee:

It should read:

(73) Assignee: Magna Donnelly Mirrors North America, LLC, Kentwood, MI (US)

Signed and Sealed this

Twenty-ninth Day of July, 2008

JON W. DUDAS
*Director of the United States Patent and Trademark Office*